United States Patent

Tsuda et al.

[11] 4,278,299
[45] Jul. 14, 1981

[54] PRESSURE CONTROL VALVE ASSEMBLY FOR AN AUTOMOTIVE SPLIT BRAKE SYSTEM

[75] Inventors: Yoshitaka Tsuda, Tokyo; Kaoru Sodeyama, Kokubunji; Naomasa Tsunada, Hachioji, all of Japan

[73] Assignee: Nissan Motor Company, Ltd., Yokohama, Japan

[21] Appl. No.: 129,855

[22] Filed: Mar. 13, 1980

[30] Foreign Application Priority Data

Mar. 20, 1979 [JP] Japan .............................. 54-35926[U]

[51] Int. Cl.$^3$ ............................................ B60T 13/00
[52] U.S. Cl. .................................... 303/6 C; 188/349
[58] Field of Search .................. 303/6 C, 84 A, 84 R; 188/349

[56] References Cited

U.S. PATENT DOCUMENTS 3,467,440   9/1969   Strien .................................... 303/6 C

FOREIGN PATENT DOCUMENTS 2811005  10/1978  Fed. Rep. of Germany .......... 303/6 C Primary Examiner—Douglas C. Butler
Attorney, Agent, or Firm—Thompson, Birch, Gauthier & Samuels

[57] ABSTRACT

A buffer or insulation member is interposed between the housing and the movable spring seat of a pressure control valve assembly and constructed to come into contact with the spring seat slightly before the piston abuttingly engages with the wall section, whereby the piston strikes against the wall section at a speed sufficiently reduced to prevent the production of an unpleasant striking sound.

5 Claims, 1 Drawing Figure

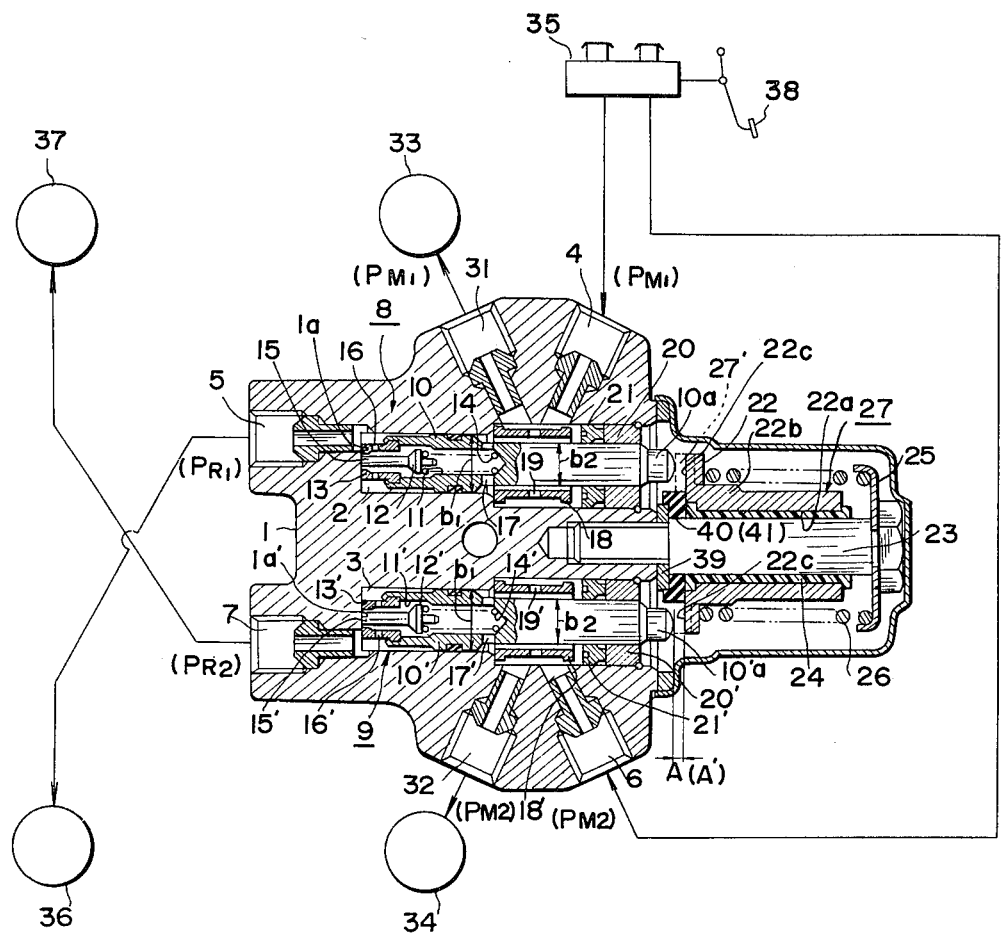

PRESSURE CONTROL VALVE ASSEMBLY FOR AN AUTOMOTIVE SPLIT BRAKE SYSTEM

BACKGROUND OF THE INVENTION

This invention relates to a pressure control valve assembly for automotive fluid brake systems to prevent the skidding or slipping of the rear wheels.

In order to obviate the skidding of the rear wheels of a motor vehicle, fluid brake systems have been provided with a pressure control valve assembly to reduce the ratio of rear wheel brake pressure to front wheel brake pressure during rapid deceleration. The control valve assembly comprises a differential piston slidably received in a stepped bore formed in a housing and valve means mounted in the piston. The valve means is selectively opened and closed in accordance with the movement of the piston to effect the above brake pressure control.

In this conventional pressure control valve assembly briefly described above, the piston is constructed to assume a position spaced from a wall section of the housing when the fluid pressure on the master cylinder side is higher than a so-called switchover point pressure. When the depression on the brake pedal is released to allow the fluid pressure on the master cylinder side to become lower than the switchover point pressure, the piston is moved into a position where it abuttingly engages with the housing under the bias of a spring. In this instance, the rapid release of the fluid pressure from the control valve assembly results in that the piston rapidly strikes against the housing, producing an unpleasant sound.

OBJECTS OF THE INVENTION

It is accordingly an object of the present invention to provide a pressure control valve assembly for an automotive split or dual circuit brake system which overcomes the foregoing drawback inherent in the conventional pressure control valve assembly of the described type.

It is another object of the present invention to provide a pressure control valve assembly of the above-mentioned character which is constructed not to produce an unpleasant striking sound even when the depression on the brake pedal is rapidly released to allow the rapid release of the fluid pressure from the pressure control valve assembly.

Further objects, features and advantages of the invention will become more apparent from the following detailed description with reference to the accompanying single FIGURE in which a preferred embodiment of a pressure control valve assembly according to this invention is schematically illustrated.

DESCRIPTION OF THE PREFERRED EMBODIMENT

A pressure control valve assembly for an automotive split or dual circuit brake system according to one embodiment of this invention will now be described in detail with reference to the drawing.

In the FIGURE, a housing 1 is formed with a pair of parallel stepped bores 2 and 3 each having an open end located at one end of the housing 1. The housing 1 is also formed with a first pair of inlet 4 and outlet 5 opening into the bore 2, and a second pair of inlet 6 and outlet 7 opening into the bore 3. Disposed in the stepped bores 2 and 3, respectively are first and second control valve units 8 and 9 which selectively establish and interrupt communication between the inlets 4 and 6 and the outlets 5 and 7, respectively.

The control valve units 8 and 9 are of identical structure, so only unit 8 will be mainly explained hereinafter for brevity. A differential piston 10 is slidably received in the stepped bore 2 and has a blind bore or a hollow section 11 in which a valve element 12 is mounted. The piston 10 also has a valve seat section 13 which is fixedly secured to the piston proper at the open end of the bore 11 and toward which the valve element 12 is biased by a spring 14. When the piston 10 moves a predetermined distance rightwardly in the drawing, the spring 14 holds the valve element 12 in its closed position. The valve element 12 has a stem 15 which is of such length as to partially protrude from the bore 11 when the valve element 12 is held in the closed position.

The valve seat section 13 is formed with a radial orifice 16 providing communication between the stepped bore 2 and the blind bore 11. The piston 10 is formed with an orifice 17 providing communication between the blind bore 11 and the inlet 4. Accommodated in the stepped bore 2 is a sleeve 18 surrounding the smaller diameter portion of the piston 10 in a manner to cooperate with same to define an annular space as shown. The sleeve 18 is formed with a radial orifice 19 which cooperates with the stepped bore 2, the orifice 17, the blind bore 11 and the orifice 16 to constitute a fluid passage providing communication between the inlet 4 and the outlet 5.

The piston 10 has an end 10a protruding from the stepped bore 2 and is supported on the housing 10 near the end 10a by means of a retainer 20 fitted in the stepped bore 2. A seal member 21 is arranged to provide a fluid-tight seal between the housing 1 and the piston 10. A movable spring seat 27 is provided which consists of a seat body 22 and a bushing 24. The bushing 24 is made of resinous material and is securely fitted in the central opening 22a of the seat body 22. The spring seat 27 is slidably mounted on a guide rod 23 which is fixed at the left-hand end to the housing 1. The guide rod 23 is provided at the right-hand end thereof with a stationary spring seat 25. Interposed between the spring seats 25 and 27 is a compression spring 26 in a pre-loaded condition. With this arrangement, the bias of the spring 27 can be transmitted through the spring seat 27 to the pistons 10 and 10' to urge same toward their extreme positions where the valve elements 12 and 12' are kept unseated from the valve seat sections 13 and 13', i.e., in the open position thereof. Reference numeral 39 designates a washer which is fixedly secured to the housing 1 by means of the guide rod 23. The washer 39 is provided with abutment means or a buffer member 40 which is made of a soft resilient material such as rubber and which is engageable with the end face 22c of the spring seat 27 to restrict the extent of movement of the valve seat 27 toward the pistons 10 and 10'. The buffer member 40 is so constructed and arranged as to come into contact with the end face 22c of the spring seat 27 slightly before the piston 10 abuttingly engages the wall section 1a of the housing 1 defining part of the axial bore 2.

The housing 1 further has formed therein a pair of outlets 31 and 32 which are in constant communication with the inlets 4 and 6 and which are connected to a brake cylinder 33 for the automotive left front wheel and a brake cylinder 34 for the automotive right front wheel, respectively. The inlets 4 and 6 are also connected respectively to the outlets of a master cylinder 35 which is in turn operatively connected to a brake pedal 38. The outlets 5 is connected to a brake cylinder for the right rear wheel, whereas the outlet 7 is connected to a brake cylinder 37 for the left rear wheel.

The pressure control valve assembly for an automotive split brake system described above operates in a manner as will be hereinafter explained.

Each piston 10 or 10' has a larger pressure sensing area $b_1$ and a smaller pressure sensing area $b_2$ ($b_1 > b_2$). When the brake pendal 38 is depressed to actuate the master cylinder 35, the fluid under pressure $P_{M1}$ and $P_{M2}$ is supplied directly to the brake cylinders 33 and 34 for the left and right front wheels through the inlets 4 and 6 and the outlets 31 and 32, respectively and at the same time to the control valve units 8 and 9. Since the valve units 8 and 9 are still in the open condition in which the valve element 12 is kept unseated from the valve seat section 13, the pressurized fluid passes through the passage constituted by the stepped bore 2, the orifice 17, the blind bore 11 and the orifice 16 and is delivered to the brake cylinders 36 and 37 through the outlets 5 and 7, respectively. Under the fluid pressure $P_M$ and the spring force F acting oppositely on each piston, the following equation holds $$P_M \cdot b_2 = \tfrac{1}{2} F$$

where $P_{M1} = P_{M2} = P_M$ $$\therefore P_M = F/2b_2$$

The fluid pressure $F/2b_2$ is called "control-starting pressure" or "switchover point pressure". The fluid pressure $P_{R1}$, $P_{R2}$ on the rear brake cylinder side is kept equal to the fluid pressure $P_{M1}$, $P_{M2}$ on the master cylinder side, that is, $P_M = P_{R1} = P_{R2} = P_R$ until the fluid pressure on the master cylinder side is increased up to the switchover point pressure.

As the operator further depresses the brake pedal until $$P_M \cdot b_2 > \tfrac{1}{2} F$$

is reached, each piston moves rightwardly in the drawing. The valve seat sections 13, 13' then abut against the valve elements 12, 12' to interrupt communication between the inlets 4, 6 and the outlets 5, 7, respectively. No fluid is thus admitted into the rear brake cylinders 36, 37. Meanwhile, the pistons 10, 10' are urged by the fluid under pressure $P_M$ in the adverse direction, i.e., leftwardly. Thus the equation holds, $$P_M(b_1 - b_2) + \tfrac{1}{2} F = P_R b_1$$

$$P_R = \frac{b_1 - b_2}{b_1} \cdot P_M + \frac{F}{2b_2} \qquad (1)$$

When the fluid pressure $P_M$ is further raised by further depressing the brake pedal, the piston resumes the initial position to put the valve element into the closed condition. Thus, the closed and opened conditions of the valve element 12 are repeated. The outlet side fluid pressure $P_M$ is raised at the reduced rate of $(b_1 - b_2)/b_1$ with the increase of the inlet-side fluid pressure $P_M$. This is quite effective in preventing the skinding of the rear wheels.

In the event of failure of one of the dual circuits, for example, of the front brake cylinder 34, the control valve unit 9 becomes inoperative and its piston continues to assume the position shown in the drawing. As the fluid pressure in the other circuit rises, the piston 10 moves rightwardly in the drawing together with the spring seat 27 against the action of the spring 26 as already described. The spring seat 27 slides on the guide rod 23 away from the protruded end 10'a of the piston 10' to put the valve element 12 into the closed condition. In this instance, the spring force is applied upon the piston 10 only.

Thus the equation holds $$P_R = \frac{b_1 - b_2}{b_1} \cdot P_M + \frac{F}{b_1} \qquad (2)$$

As will be understood when compared with the equation (1), only one control valve develops a braking fluid pressure large enough to compensate for the lack of braking force due to the failure of one of the dual circuit. Upon further depressing the brake pedal 38, the fluid pressure $P_R$ on the rear brake side is gently raised at the rate of $(b_1 - b_2)/b_1$ with the increase of the fluid pressure $P_M$ on the master cylinder side. The skidding of the rear wheels can therefore be prevented similarly to the case in which the two circuits are in the correct or normal condition.

When the depression on the brake pedal 38 is removed, the fluid pressure on the master cylinder side is reduced with the movement of the brake pedal toward its initial position. During the time when the magnitude of the fluid pressure on the master cylinder side is still larger than the foregoing switchover point pressure, the piston 10 is held in a position spaced from the wall section 1a. When the magnitude of the fluid pressure on the master cylinder side is further reduced beyond a value corresponding to the switchover point pressure, the piston 10 is urged, through the spring seat 27, by means of the spring 26 to move leftwardly in the drawing. During this time when the piston 10 is returning, the end face 22c of the movable spring seat 27 comes into abutting engagement with the buffer member 40 prior to the abutment of the piston upon the wall section 1a. Flexing or deforming the buffer member 40 to have a reduced rapidity in returning, the valve seat 27 then urges the piston 10 against the end wall 1a. The piston 10 thus strikes against the wall section at a reduced speed such that no unpleasant sound is substantially produced. The end face 22c of the spring seat 27 assumes the position illustrated by the solid lines when it comes into contact with the buffer member 40 and the position illustrated by the dotted lines when the piston 10 is in engagement with the end wall 1a while urged by the spring 26 in the maximumly expanded condition. The distance A between the above two positions of the end face 22c of the spring seat 27 also represents the maximum amount of deformation of the buffer member 40 in use. The buffer member 40 is fitted to the washer 39 as already described. Alternatively, the buffer member 40 may be fitted to the end face 22c of the spring seat 27. In these two arrangements of the buffer member 40, a small clearance may be provided between the end face 22c of the spring seat 27 in its extreme or maximumly returned position and the end 10a of the piston 10 in such a position that the piston engages at its other end with the wall section 1a. The provision of the clearance does not result in any disadvantage in attaining the foregoing braking force control to prevent skidding and locking.

Alternatively, an insulation member 41 may be employed as abutment means in place of the buffer member 40. The insulation member 41 is made of a relatively hard shock-absorbing material such as a shock-absorbing alloy and serves as a stopper to positively define the extreme position of the spring seat 27. The insulation member 41 is press-fitted or otherwise fixedly secured to the washer 39. In this instance, the arrangement is made such that, when the end face 22c of the spring seat 27 assumes its extreme position where it abuts on the insulation member 41, there is provided a small clearance A' between the end face 22c of the spring seat 27 and the end 10a of the piston 10 in the position where the piston engages at its other end with the wall section 1a. The clearance A' is determined so as to be smaller than the foregoing clearance A. With this arrangement, the bias of the spring 26 cannot be applied to the piston 10 during its movement over the distance A'. The piston 10 thus strikes against the wall section 1a at a reduced speed sufficient to prevent the production of an unpleasant striking sound, while on the other hand the insulation member 41 and the end face 22c of the spring seat 27 are prevented from producing an unpleasant sound upon their striking against each other due to the suitable insulation material of the member 41. The bias of the spring 26 is however applied to the piston 10 when the piston moves rightwardly in the drawing after having accomplished the distance A', which does not result in any disadvantage in attaining the foregoing braking force control.

From the foregoing, it is to be appreciated that a pressure control valve for an automotive split or dual circuit brake system according to this invention is provided with a buffer or insulation member which is interposed between a housing 1 and a spring seat 27 and constructed to come into contact with same slightly before a piston 10 or 10' abuttingly engages with a wall section 1a or 1a', whereby the piston strikes against the wall section at a reduced speed sufficient to prevent the production of an unpleasant striking sound.

What is claimed is:

1. In a pressure control valve assembly for an automotive split brake system having a master cylinder and a brake cylinder, the pressure control valve assembly including a housing having a stepped bore and a wall section defining part of said bore, a differential piston slidable within said bore and having a hollow section, said hollow section cooperating with said bore to form part of a fluid passage providing communication between said master cylinder and said brake cylinder, said wall section being abuttingly engageable with said piston to determine an extreme position of same, biasing means for urging said piston into said extreme position and having a spring seat movable toward and away from said housing while bearing on said piston, and valve means mounted in said hollow section of said piston for selectively opening and blocking said fluid passage in accordance with the positions of said piston, said piston being exposed to the fluid pressures in the master cylinder and the brake cylinder and assuming its position in accordance with said fluid pressures such that the rate of the pressure increase in said brake cylinder to the pressure increase in said master cylinder is reduced when the fluid pressure in said master cylinder is increased beyond a predetermined switchover point pressure, the improvement comprising an abutment member interposed between said housing and said spring seat at a location such that upon movement of said piston into said extreme position, said spring seat will contact said abutment member before said piston contacts said wall section.

2. The improvement in a pressure control valve assembly as claimed in claim 1, in which said abutment member is a buffer member which is made of a soft resilient material.

3. The improvement in a pressure control valve assembly as claimed in claim 1, in which said abutment member is an insulation member which is made of a relatively hard shock-absorbing material.

4. The improvement in a pressure control valve assembly as claimed in claim 1, in which said abutment member is fixedly secured to said housing.

5. The improvement in a pressure control valve assembly as claimed in claim 1, 2, 3 or 4 in which said spring seat has an end face cooperatively associated with one end of said piston and in which a clearance is provided between said end face of said spring seat in its extreme position and said one end of said piston in such a position thereof that the piston engages at its other end with said wall section.

* * * * *